US007854072B2

(12) United States Patent
Stark

(10) Patent No.: US 7,854,072 B2
(45) Date of Patent: Dec. 21, 2010

(54) PRECISION SINE VISE

(76) Inventor: Michael Curt Stark, 5309 Lakeview Blvd, Lake Oswego, OR (US) 97035

( * ) Notice: Subject to any disclaimer, the term of this patent is extended or adjusted under 35 U.S.C. 154(b) by 87 days.

(21) Appl. No.: 12/154,367

(22) Filed: May 21, 2008

(65) Prior Publication Data

US 2009/0289404 A1 Nov. 26, 2009

(51) Int. Cl.
*B23Q 3/04* (2006.01)

(52) U.S. Cl. .......................................... 33/537; 33/568

(58) Field of Classification Search ................... 33/536, 33/537, 538, 568, 569, 570
See application file for complete search history.

(56) References Cited

U.S. PATENT DOCUMENTS 1,507,815 A * 9/1924 Cumner ....................... 269/79
2,075,008 A * 3/1937 Damm et al. ............... 409/168
2,365,436 A * 12/1944 Saucier ........................ 269/69
2,567,517 A * 9/1951 Keebler ....................... 269/73
3,200,503 A * 8/1965 Gutknecht ................... 33/536
3,862,498 A * 1/1975 Klucznik ..................... 33/538
4,243,213 A * 1/1981 Georgian .................... 269/137
4,398,349 A * 8/1983 Bailey ......................... 33/537
4,927,125 A * 5/1990 Hunter ........................ 269/74
5,018,277 A * 5/1991 Frost ........................... 33/538
5,363,563 A * 11/1994 Hunter ........................ 33/568
6,775,917 B1 * 8/2004 Campbell .................... 33/640

* cited by examiner

*Primary Examiner*—Christopher W Fulton
(74) *Attorney, Agent, or Firm*—Mark S. Hubert

(57) ABSTRACT

An improved sine vise that overcomes the deficiencies and limitations of conventional sine vises through the use of the following features: a circular sawtooth ratchet quick clamping system; a rotating dual jaw with one V cut depression face; a set of extended opening upper jaw lips; angle adjustment stays with counter rotating locking screws; a T shaped jaw clamping drawbar; a zero tolerance roll hinge; and a lipped vise base adapted for robust clamping to the cutting tool table with conventional T slot bolts and dogs.

10 Claims, 11 Drawing Sheets

PRECISION SINE VISE

BACKGROUND OF THE INVENTION

The present invention relates to a extremely sturdy and versatile machinist's sine vise adapted to provide a strong, quick adjusting clamp with enhanced directional stability that is capable of allowing the user to achieve extremely narrow dimensional and angular tolerances on clamped work pieces. More particularly, to a robust sine vise designed to provide for a "chatter free" machining environment.

The level of accuracy and dimensional tolerance that can be achieved in the machining of a held workpiece by a rotating cutter is affected by several factors besides the capability of the machinist. Primarily these are: how tightly the workpiece can be held (clamping force) in the vise in all three dimensions; how much movement any vise component has relative to the other vise components (backlash); and how much movement the vise undergoes relative to the cutting tool's table when a cutting load is applied (chatter).

Traditionally vises have utilized a central screw housed in the vise body which is rotated to advance a linear jaw towards the vise body to clamp the workpiece. This does not transmit equal clamping force along the axial axis of the jaw, therein allowing side to side movement of the clamped workpiece. When the workpiece is not located completely at the bottom of the jaw, this screw design allows for a slight vertical tipping of the workpiece when the jaw is tightened. Movement of the jaw is slow, as it is dictated by the thread pitch of the central screw. Traditional vises have smooth faces on their jaw and the mating face on the vise body which makes clamping of cylindrical workpieces parallel to the axial axis of the vise difficult. Since the forces the rotating cutter transmits to the vise are substantial, the vise jaw must be stout thereby reducing the jaw opening. After setting a traditional sine vise body at a precise angle relative to the cutting tool table, the act of tightening the angle adjustment screws draws the jaw and vise body on a slight angle normal to the set angle. Traditional hinges between the vise body and base have axial backlash with respect to the hinge. If it does have a V cut depression along the axial axis of the jaw to hold cylindrical work pieces, non cylindrical work pieces may be damaged when clamped. Moreover, all of the aforementioned sources of movement in traditional sine vises act in unison to allow chatter, increase dimensional tolerances and decrease overall precision in the machining of work pieces.

Simply stated, the present sine vise overcomes all of the stated deficiencies of the traditional prior art through the use of the following features: a sawtooth ratchet quick clamping system; a rotating dual jaw with one V cut depression face; a set of extended opening jaw lips; dual side locking stays with counter rotating lock screws; a T shaped jaw clamping drawbar; a zero tolerance cylindrical hinge and a lipped vise base adapted for robust clamping to the cutting tool table with conventional T slot bolts and dogs.

Henceforth, the present invention, an improved sine vise would fulfill a long felt need in the fabrication industry. This new invention utilizes and combines known and new technologies in a unique and novel configuration to overcome the aforementioned problems inherent in the prior art.

SUMMARY OF THE INVENTION

The general purpose of the present invention, which will be described subsequently in greater detail, is to provide a precision sine vise that is able to overcome the workpiece holding problems of the prior art sine vises and provide increased proportional clamping force, reduced backlash and chatter. It has many of the advantages mentioned heretofore and many novel features that result in a new and improved sine vise which is not anticipated, rendered obvious, suggested, or even implied by any of the prior art, either alone or in any combination thereof.

In accordance with the invention, an object of the present invention is to provide an improved sine vise capable of rapid, even clamping of work pieces.

It is another object of this invention to provide an improved sine vise capable of achieving a higher degree of precision when positioning a workpiece relative to a cutting tool.

It is a further object of this invention to provide an improved sine vise with a rotatable jaw capable of clamping cylindrical objects.

It is still a further object of this invention to provide for an improved sine vise with a dual set of clamping faces so as to enable an enhanced range of jaw opening.

It is yet a further object of this invention to provide an improved sine vise with a zero tolerance hinge and angle lock system.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

Figure 1:
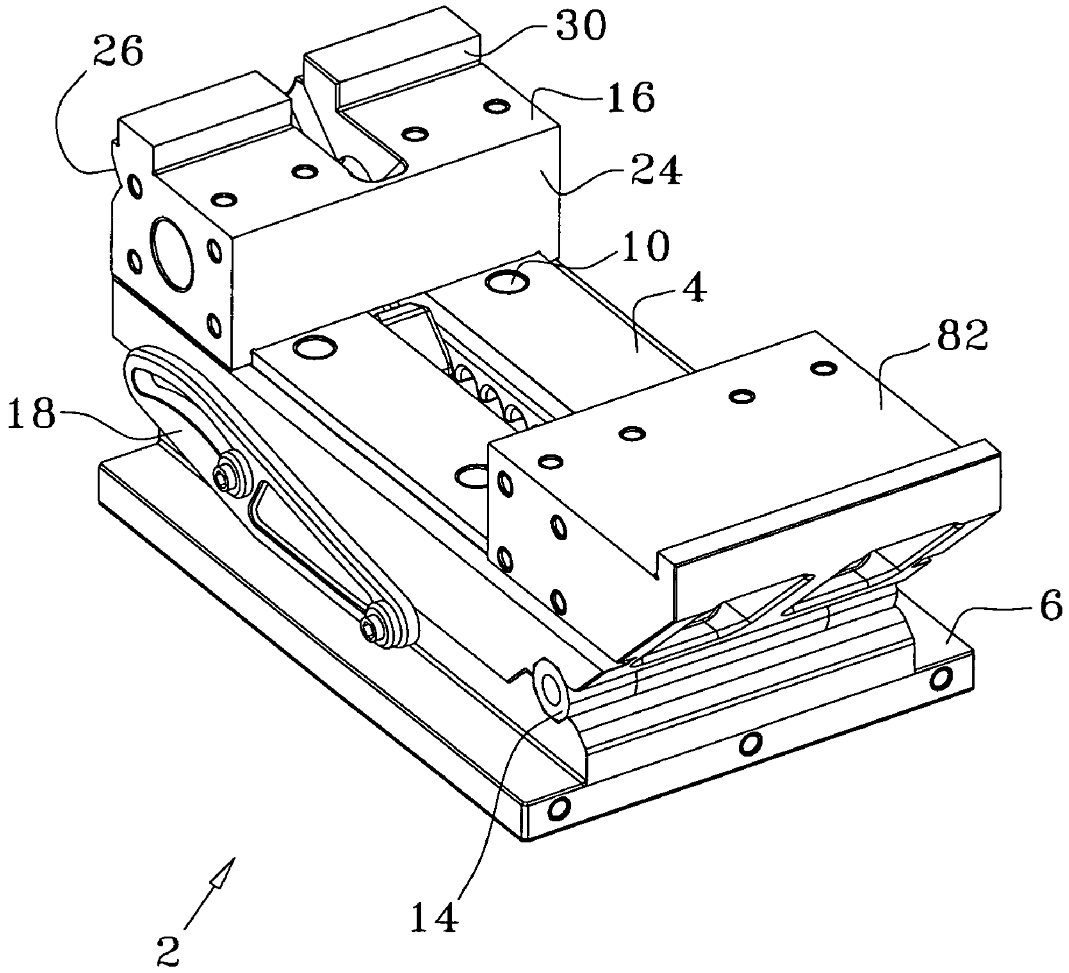
FIG. 1 is a perspective view of the precision sine vise in the standard vise configuration.
Figure 2:
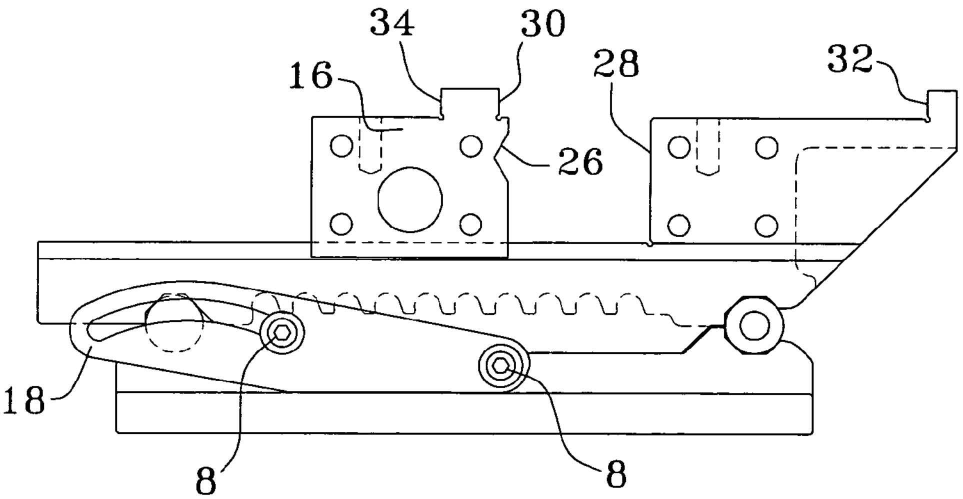
FIG. 2 is a phantom side view of the precision sine vise with the moveable jaw in the V notch position.
Figure 3:
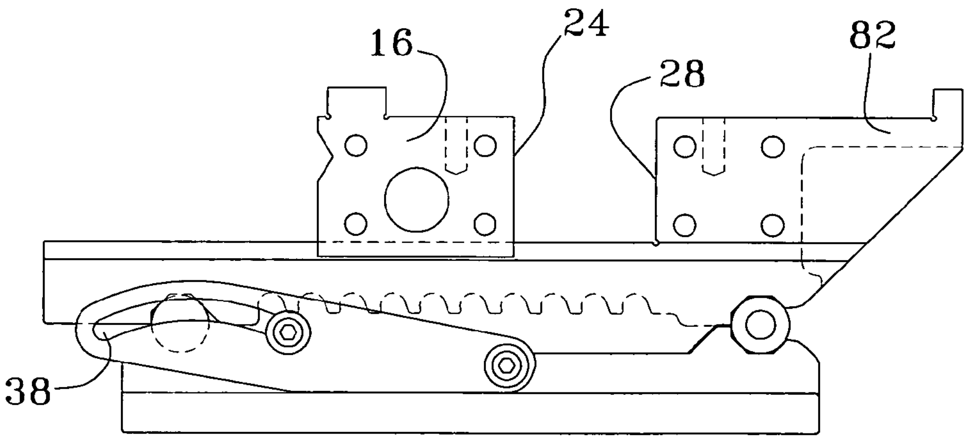
FIG. 3 is a phantom side view of the precision sine vise with the moveable jaw in the parallel face position.
Figure 4:
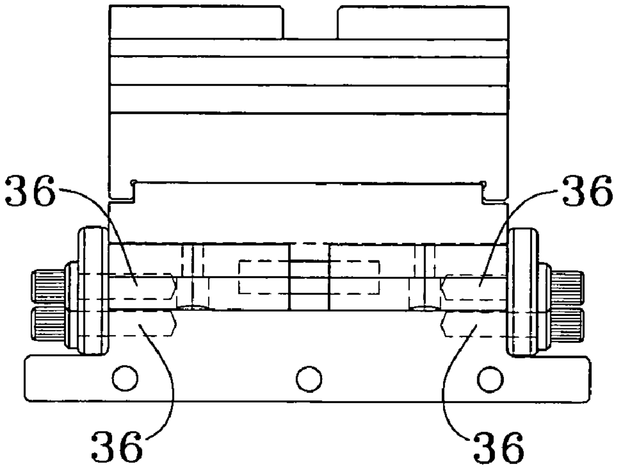
FIG. 4 is a phantom back end view of the precision sine vise.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Figure 7:
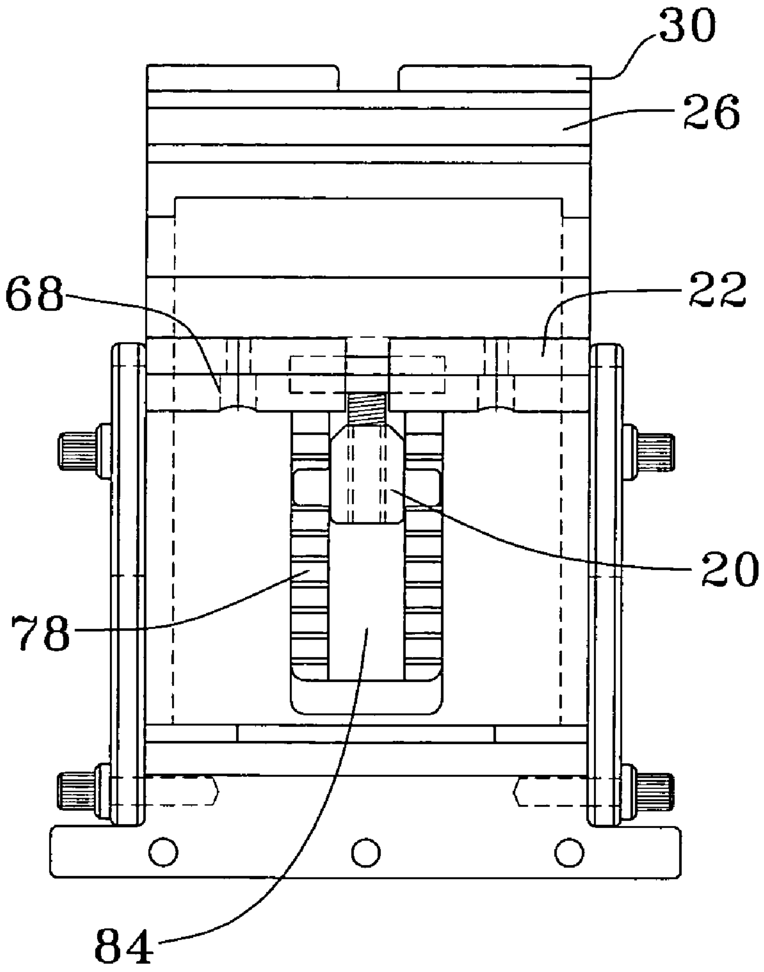
FIG. 7 is a phantom front end view of the precision vise in an angled configuration.
Figure 8:
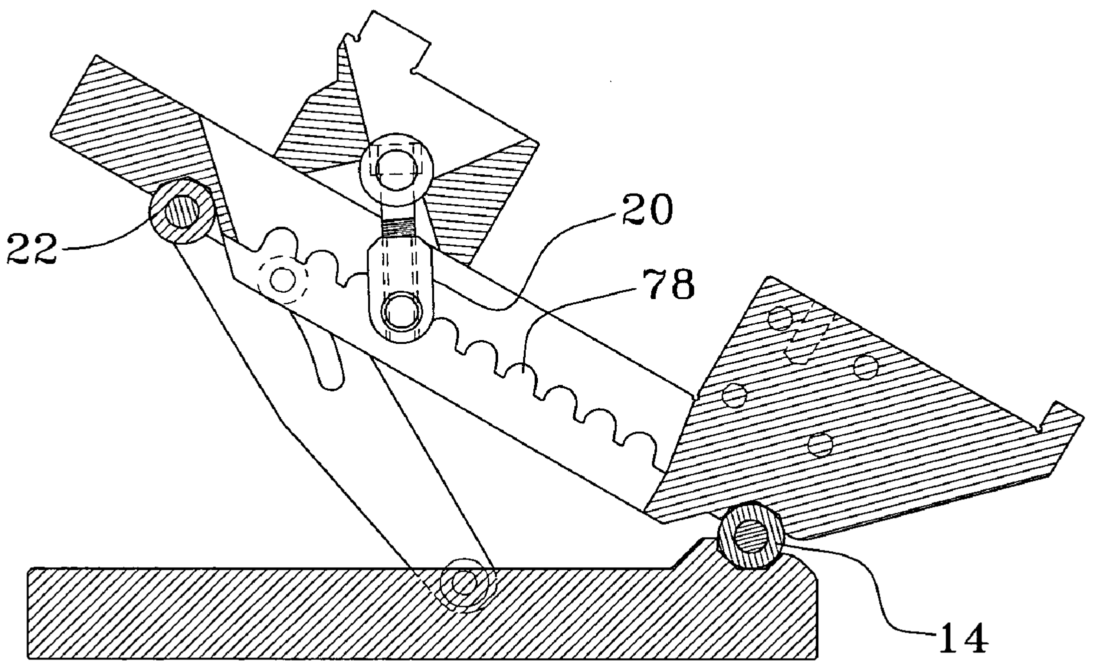
FIG. 8 is a cross sectional view of the precision sine vise in an angled configuration.
Figure 9A:
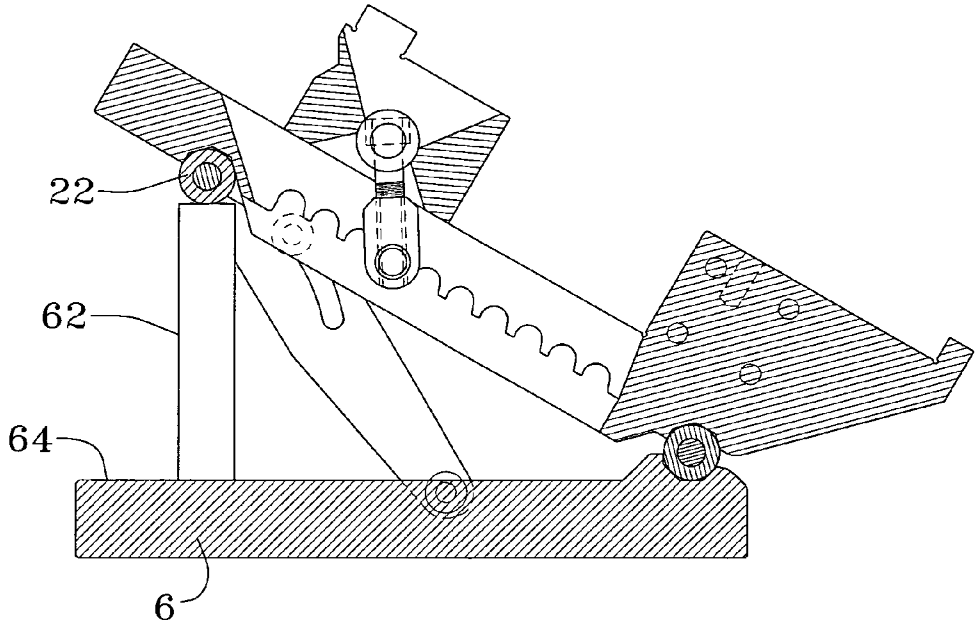
FIG. 9A is a cross sectional view of the precision sine vise in an angled configuration using a gauge block on the gauge roll.
Figure 9B:
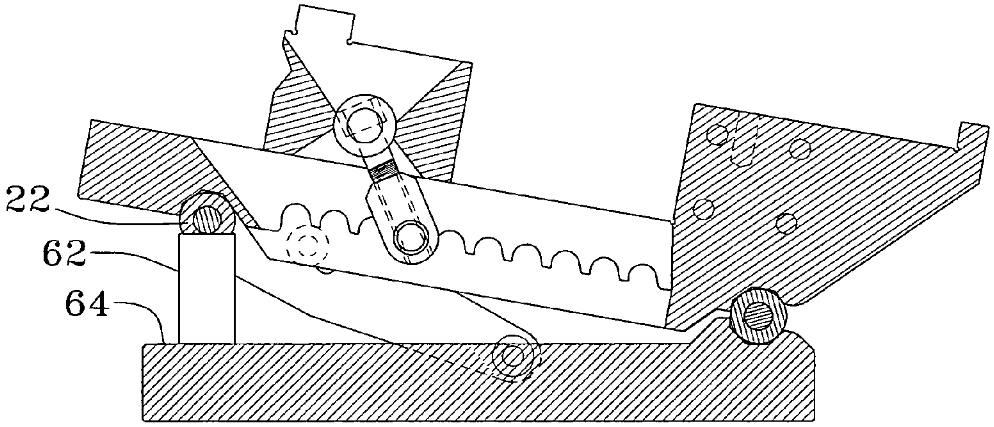
FIG. 9B is a cross sectional view of the precision sine vise in an angled configuration using a gauge block at the precision detent of the gauge roll.
Figure 13:
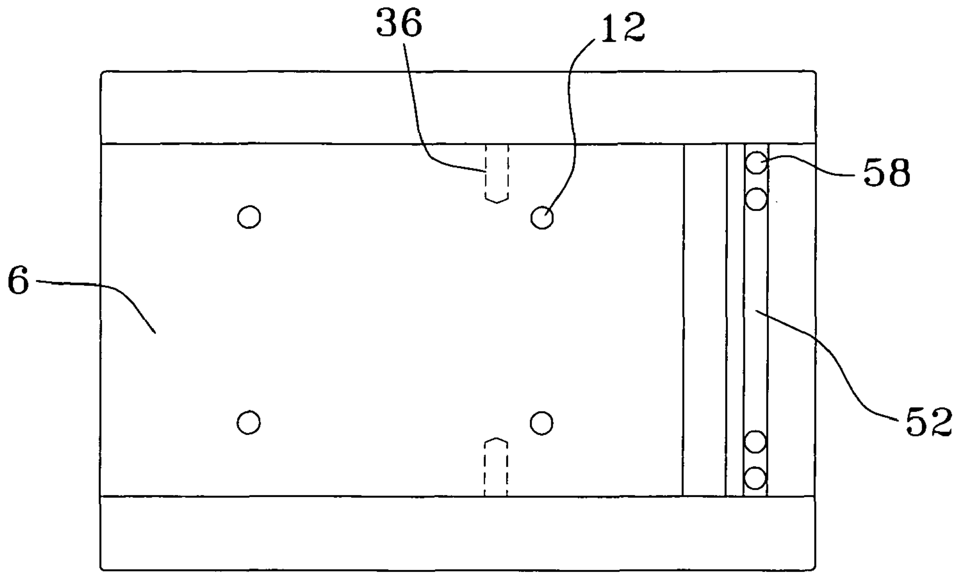
FIG. 13 is top view of the precision sine vise base clamp plate.
Figure 19:
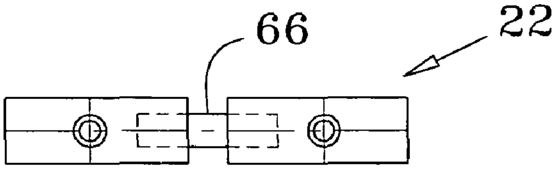
FIG. 19 bottom view of the precision sine vise gauge roll.
Figure 20:
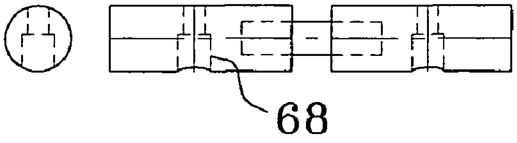
FIG. 20 is a phantom side view of the precision sine vise gauge roll.

The improved precision sine vise 2 (FIG. 1) is made up of a plethora of threaded mechanical fasteners (which in the preferred embodiments are cap head screws) and seven major components: a body 4; a base clamp plate 6; a moveable jaw 16; a pair of locking side stays 18, a ratchet draw bar 20 (FIGS. 7, 8 & 20); a roll hinge 14; and a gauge roll 22 (FIGS. 8 & 19). It is to be noted that the vise 2 has six jaw faces that may be configured into four different jaw clamping arrangements. (If one considers the V groove as a separate section for clamping cylindrical objects only, it could be said that the sine vise has seven faces.) Looking at FIGS. 1-4 the precision sine vise 2 (vise) is presented in a standard vise configuration wherein the vise body 4 is rigidly connected to the vise base clamp plate 6 by mechanical fasteners 8 (FIG. 11) which extend through orifices 10 in vise body 4 and engage threaded recesses 12 in base clamp plate 6 (FIG. 13). In this configuration roll hinge 14 cannot allow angular movement between the body 4 and the clamp plate 6 and thus any stress upon the hinge roll that could eventually lead to lateral wear is avoided. Thus all six jaw faces remain perpendicular to the base clamp plate 6. In this standard vise configuration, each of the locking side stays 18 are frictionally engaged at their proximate end to the base clamp plate 6 by mechanical fasteners 8 that pass through stay orifices 40 and are threadingly engaged with threaded stay recesses 36 in the base clamp plate. The distal end of the locking side stays has an arced slot 38 formed therein through which mechanical fasteners 8 pass through and are threadingly engaged with other threaded stay recesses 36 in the vise body 4 so as to frictionally engage the locking side stays distal end with the vise body 4. This feature adds extra strength to prevent any movement between the vise body 4 and the base clamp plate 6. It also reduces any stress upon the hinge roll that could eventually lead to lateral wear. The arced slot 38 allows for alignment of the mechanical fasteners 8 with the stay recesses 36 in the vise body 4 when the vise body is angled relative to the base clamp plate 6.

Figure 5:
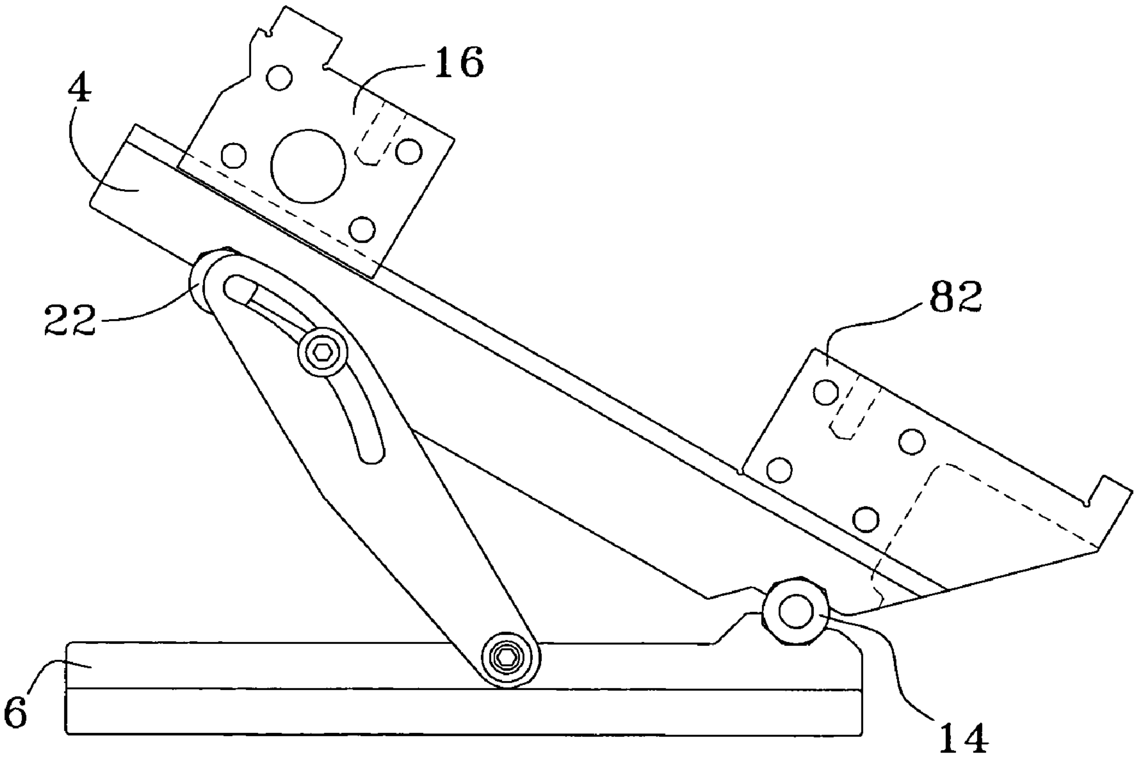
FIG. 5 is phantom side view of the precision sine vise in an angled configuration.
Figure 6:
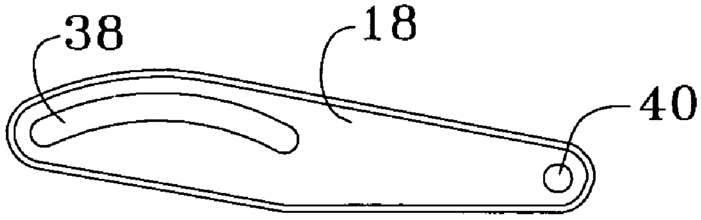
FIG. 6 is a side view of a side locking stay.

To ensure that the tightening of all mechanical fasteners 8 associated with the locking side stays 18 cannot tilt the vise body 4 relative to the base clamp plate 6 the mechanical fasteners 8 on one side have a right hand thread and the mechanical fasteners 8 on the other side have a left hand thread while all stay recesses 36 have the same handed thread configuration. In this manner, tightening of the mechanical fasteners 8 imparts an opposing, balanced torque on the vise body 4. This feature is critical when the vise 2 is used in an angled configuration (FIG. 5) as the vise body 4 is no longer rigidly connected to the vise base clamp plate 6 by mechanical fasteners 8 (FIG. 11) extending through vise body orifices 10 in vise body 4 to engage threaded recesses 12 in base clamp plate 6.

Figure 12:
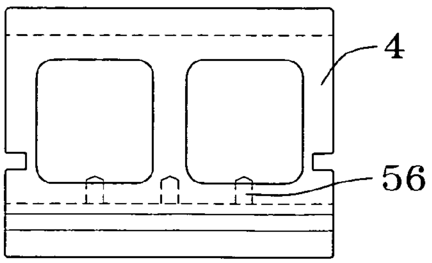
FIG. 12 is a phantom back end view of the precision sine vise.
Figure 16:
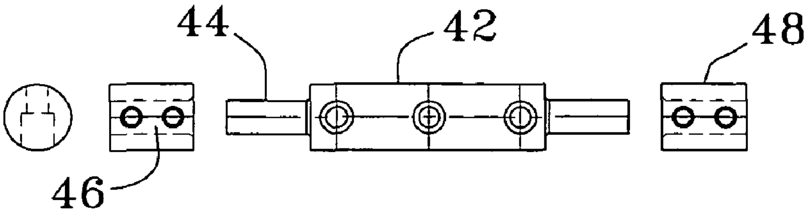
FIG. 16 is a bottom view of the precision sine vise disassembled roll hinge.
Figure 17:
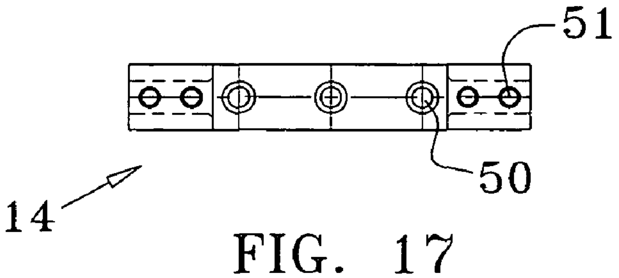
FIG. 17 is bottom view of the precision sine vise assembled roll hinge.
Figure 18:
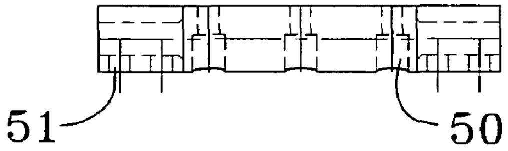
FIG. 18 is a phantom side view of the precision sine vise assembled roll hinge.

In the sine vise configuration of FIGS. 5 & 7-9 it can be seen that vise body 4 is angled relative to base clamp plate 6 about the axial midpoint of roll hinge 14. Looking at FIGS. 16-18, roll hinge 14 is made of a cylindrical hinge pin 42 having reduced diameter ends 44 that rotationally engage matingly sized hinge bores 46 formed in hinge pin sleeves 48. The hinge pin 42 has multiple axial first bores 50 formed therethrough its larger diameter central area. The hinge pin sleeves 48 have multiple axial threaded second bores 51 extending to the hinge bores 46. When assembled, the roll hinge 14 resides partially in a lower trough 52 (FIGS. 13 & 14) milled normal to the longitudinal axis of base clamp plate 6 and in an upper trough 54 milled normal to the longitudinal axis of vise body 4. The hinge pin 42 is affixed to the vise body 4 by multiple mechanical fasteners that pass through the hinge pin's axial first bores 50 and matingly engage with vise body threaded recesses 56 (FIG. 12). The base clamp plate 6 is affixed to the hinge pin sleeves 48 by multiple fasteners passing through base clamp plate threaded roll hinge recesses 58 and into the hinge pin sleeve's second bores 51. In this manner the roll hinge 14 resides with its longitudinal axis parallel to the longitudinal axis of the upper trough 52 and lower trough 54. Securement of each of the hinge pin sleeves 48 on opposite ends of the roll hinge 14 to the base clamp plate 6 minimizes any opening torque on the vise body 2.

Figure 27:
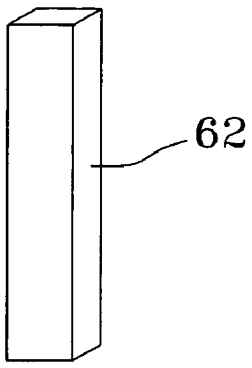
FIG. 27 is a perspective view of a gauge block.

Also looking at the sine vise configuration of FIGS. 5 & 7-9 the gauge roll 22 can be seen residing in a gauge roll trough 60 (FIG. 10) milled in the vise body 4. This gauge roll trough 60 is parallel to and substantially similar in design and orientation to the upper and lower troughs. Its longitudinal center resides 10 inches from the longitudinal center of the roll hinge 14. This enables simple multiplication by ten of the sine of the desired vise angle to determine the height of gauge block 62 (FIGS. 9 & 27) required to be placed between the roll gauge 22 and the base clamp plate deck 64. The gauge roll 22 has a narrowed central ground roll 66 that resides a fixed depth (preferably 0.250 inches) lower than the rest of the gauge roll 22. The central ground roll 66 is a right cylinder that has each of its ends frictionally engaged in correspondingly sized recesses 23 in the gauge roll ends 21. This enables minute angle changes using conventional sets of gauge blocks 62 against this narrowed central portion.

Similar to the hinge pin 42 the roll gauge 22 is secured to the vise body 4 by mechanical fasteners passing through gauge roll orifices 68 and matingly engaging with vise body threaded recesses (recesses not illustrated).

All mechanical fasteners used in conjunction with the roll hinge 14 and gauge roll 22 are recessed with respect to their respective outer surfaces and the bottom of the base clamp plate 6.

Figure 14:
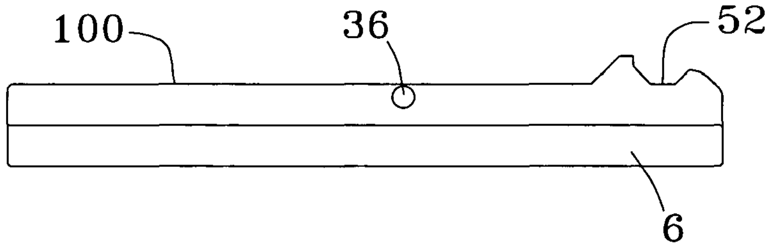
FIG. 14 is side view of the precision sine vise base clamp plate.
Figure 15:
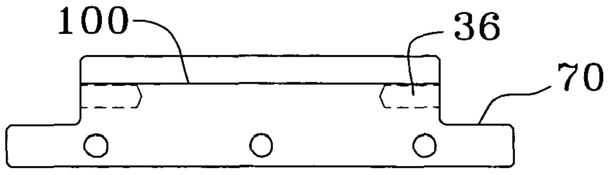
FIG. 15 is phantom back end view of the precision sine vise base clamp plate.

The base clamp plate 6 can be seen in FIGS. 13-15. It has two parallel and substantially similar plate rabbets 70 running along the longitudinal peripheral edges of top deck 100 to facilitate a clamping surface to affix the base clamp plate 6 to the cutting tool's table. It has threaded recesses 12 therein to attach the vise body 4, stay recesses 36 to attach the side stays 18, and roll hinge recesses 58 to attach the hinge pin sleeves 48.

Figure 10:
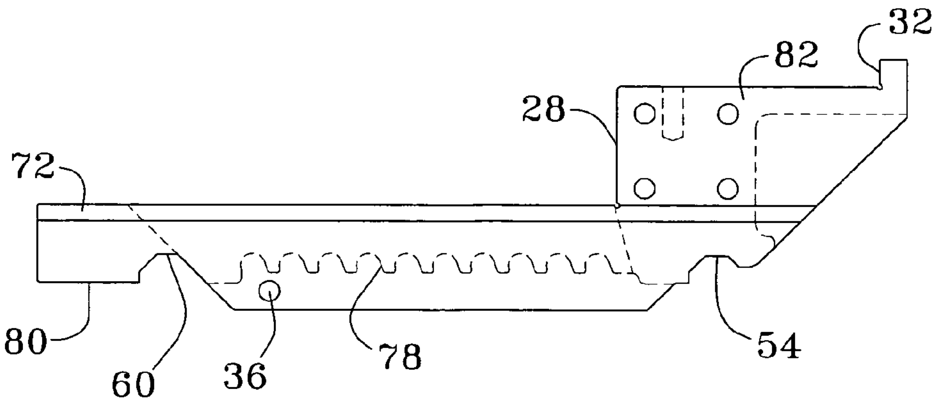
FIG. 10 is a phantom side view of the precision sine vise body.
Figure 11:
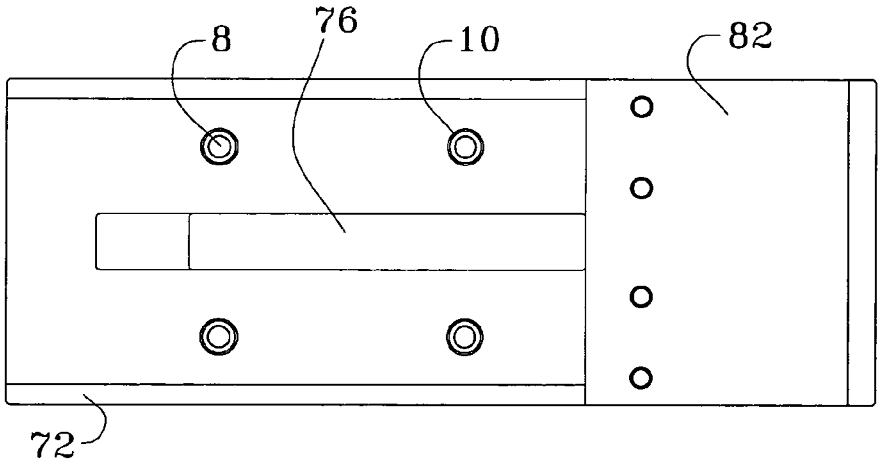
FIG. 11 is a top view of the precision sine vise body.

The vise body 2 as seen in FIGS. 10-12, has two parallel and substantially similar body rabbets 72 running along the longitudinal peripheral edges to facilitate a linear guide for the sliding movement of the moveable jaw 16 along the vise body 4. The moveable jaw has a set of slidingly engageable peripheral lips 74. The vise body 4 has a central trough 76 to allow the passage of the ratchet drawbar 20. Cylindrical sawtooth racks 78 are arranged in a parallel configuration on the bottom face 80 of the vise body 4 adjacent either side of the central trough 76. The diameter of the sawteeth are matingly conformed to accept the ratchet drawbar 20. On the bottom face 80 of the vise body are milled lower trough 54 and gauge roll trough 60. There are threaded stay recesses 36 formed therein that reside normal to vise body orifices 10 which are used to attach the vise body 4 to the base clamp plate 6. Formed at one end is a fixed jaw 82 with lower fixed face 28 and upper fixed face 32.

Figure 21:
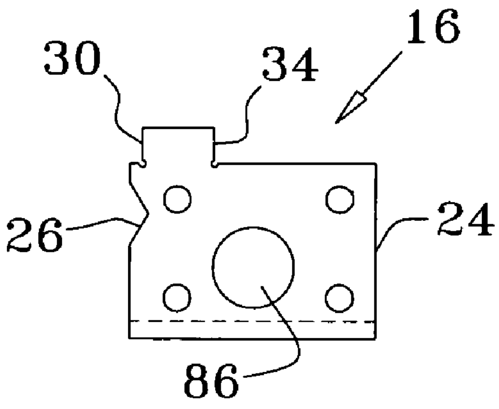
FIG. 21 is a side view of the precision sine vise moveable jaw.
Figure 22:
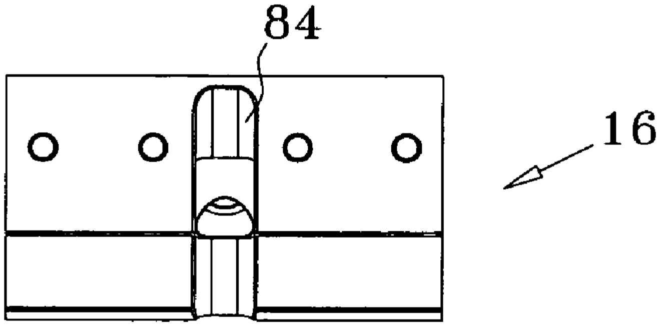
FIG. 22 is a top view of the precision sine vise moveable jaw.
Figure 23:
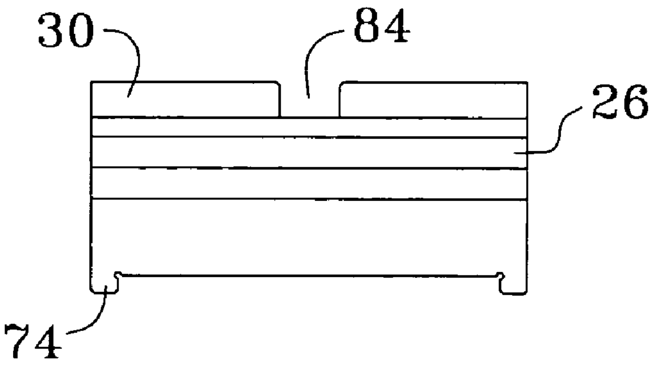
FIG. 23 is an end view of the precision sine vise moveable jaw's V cut face.
Figure 24:
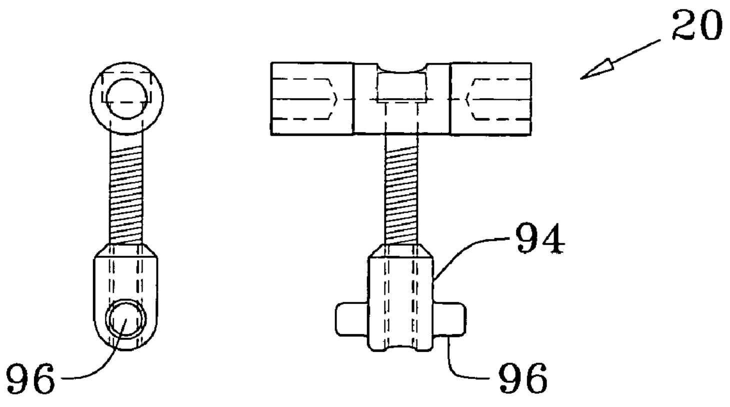
FIG. 24 is set of phantom side and phantom end views of the precision sine vise assembled drawbar.
Figure 25:
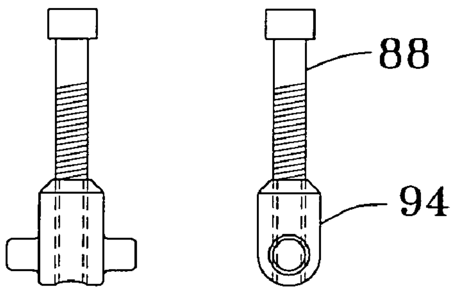
FIG. 25 is a set of phantom end and phantom side views of the precision side vise ratchet arm.
Figure 26:
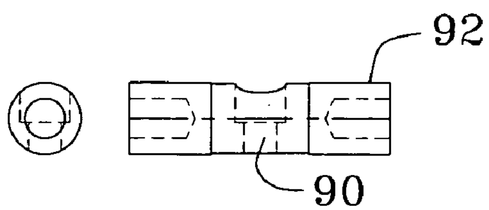
FIG. 26 is a set of phantom side and phantom end views of the precision sine vise clamp cylinder.

Looking at FIGS. 21-23 the design of the moveable jaw 16 can best be seen. Moveable jaw 16 is a rectangular block that has an axial draw bar groove 84 formed therein that is intersected by a longitudinal clamp cylinder bore 86. The moveable jaw 16 has lower plain face 24 and an upper plain face 34 on one of the sides of this block and a V cut lower face 26 and a V cut upper face 30 on a parallel side. Depending upon the orientation of the moveable jaw 16, a workpiece can be held in four different ways: between either of lower plain face 24 or lower V cut face 26 and fixed lower face 28; and between either of upper plain face 34 or upper V cut face 30 and upper fixed face 32. Using the upper faces increases the clamping capacity of the sine vise 2 over that of the lower faces by a considerable amount (approximately seven inches in the preferred embodiment).

The moveable jaw 16 is tightened against the fixed jaw 82 or any intervening workpiece by the ratchet drawbar 20. Ratchet drawbar 20 has three components. It is made from a threaded capscrew 88 that rotationally fits through a capscrew bore 90 in clamp cylinder 92 and threading engages into rack engagement dog 94. Rack engagement dog 94 has two dog stubs 96 that are dimensionally sized for engagement with the two sawtooth racks 78.

In operation as a standard vise, the vise body 4 is bolted to the base clamp plate 6 and the stays 18 are tightened to frictionally engage the vise body 4 and the base clamp plate 6. Moveable jaw 16 is placed atop the vise body 4 such that sliding movement between these components is directed by vise body rabbets 72 and moveable jaw peripheral lips 74. Clamp cylinder 92 is frictionally engaged into clamp cylinder bore 86 of moveable jaw 16. The capscrew bore 90 is aligned with axial draw bar groove 84 such that capscrew 88 may be inserted through axial draw bar groove 84 and capscrew bore 90 so as to extend through moveable jaw 16 and down through central trough 76 of vise body 4. Rack engagement dog 94 is threadingly engaged with capscrew 88 such that the two dog stubs 96 are in close enough proximity to engage the two sawtooth racks 78 with a minimal amount of turns of the capscrew 88. Reversing these turns will allow the rack engagement dog 94 to swing free of the sawtooth racks 78 so as to allow rapid clamping adjustment and setup. The use of clamp cylinder 92 allows the clamping force to be transmitted equally in a linear fashion across the faces of the moveable jaw 16. This effectively maintains the planes of the moveable jaw 16 and the fixed jaw 82 parallel. Additionally, the angled engagement of the rack engagement dog 94 in the sawtooth racks 78 ensures that the jaw faces of the moveable jaw cannot tip upwards when a workpiece that does not reside along the full horizontal faces of the selected jaw combination, is clamped. Basically, the ratchet drawbar 20 exerts a downward angular pull on the moveable jaw 16 from the midpoint of the moveable jaw which allows the moveable jaw to slide uniformly without any lateral, axial or angular tilting. In this manner the moveable jaw 16 advances uniformly along the vise body 4, guided by the by vise body rabbets 72 and moveable jaw peripheral lips 74 such that the vertical planes of the moveable jaw faces and the fixed jaw faces remain parallel at all times.

In operation as a sine vise, the vise body 4 as above, is unbolted from the base clamp plate 6 and the stays 18 are loosened. The vise body 4 is angularly pivoted away from the base clamp plate 6 about the longitudinal axis of roll hinge 14 and gauge blocks 62 are positioned between the top deck 100 of the base clamp plate 6 and the gauge roll 22. (In the preferred embodiment this angle is limited to 50 degrees.) The stays 18 are tightened, the gauge blocks removed and the clamping procedure as set out above may be utilized to secure the workpiece in the jaws. Regardless of the vise configuration, with the ratchet drawbar 20 loosened sufficiently, the moveable jaw 16 may be rotated 180 degrees so that clamped workpieces will engage either the side of the moveable jaw with the conventional face 24 or the side of the moveable jaw with the V channel face 26. All faces are generally planar and when engaged will always reside parallel to the upper fixed jaw face and the lower fixed jaw face 28.

A plethora of additional bores, threaded or otherwise are illustrated on the moveable jaw 16, the vise body 4 and the base clamp plate 6. These are to facilitate the attachment of accessories collateral to and not the subject of this patent. It is understood and well known in the art which surfaces of the various vise components must reside parallel or perpendicular to one another and the cutting tool table to ensure precision use. Experimentation has shown that tolerances as tight as 0.0002 of an inch may be achieved with this device.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and desired to be secured by Letters Patent is as follows:

1. An improved vise comprising:

a body having a top surface and a bottom surface and a central slot formed therethrough, and a fixed jaw formed thereon said top surface;

a moveable jaw with an axial orifice formed therethrough;

a ratchet drawbar having a proximate end and a distal end;

a base clamp plate attached to said bottom surface of said body so as to form a peripheral edge extending from said body;

at least one mechanical fastener;

a roll hinge affixed adjacent a distal end of said bottom surface of said body;

a gauge roll affixed adjacent a proximate end of said bottom surface of said body; and at least one locking side stay, that engages to said base and to said body with said mechanical fasteners to constrain said body relative to said base at an acute angle formed there between said base and said body;

wherein said proximate end engages said moveable jaw, said ratchet drawbar passes through both said axial orifice and said central slot, and said distal end engages said bottom surface of said body so as to slidingly connect said moveable jaw to said body; and wherein said body is attached to said base clamp plate by at least one said mechanical fastener, and wherein said body is pivotally attached to said base by said roll hinge, and and wherein said ratchet drawbar comprises a threaded fastener, a clamping cylinder and a ratchet engagement means having two cylindrical stubs with a common longitudinal axis extending therefrom, wherein said threaded fastener extends through an axial through bore in said clamping cylinder and threadingly engages said ratchet engagement means, and wherein said fastener is a capscrew, and wherein said moveable jaw has a longitudinal orifice formed therethrough that intersects said axial orifice and is adapted to house said clamping cylinder therein such that said clamping cylinder resides in a parallel configuration with two jaw faces thereon said moveable jaw.

2. An improved vise comprising:

a body having a top surface and a bottom surface and a central slot formed therethrough, and a fixed jaw formed thereon said top surface;

a moveable jaw with an axial orifice formed therethrough; and a ratchet drawbar having a proximate end and a distal end;

wherein said proximate end engages said moveable jaw, said ratchet drawbar passes through both said axial orifice and said central slot, and said distal end engages said bottom surface of said body so as to slidingly connect said moveable jaw to said body; and wherein said movable jaw has at least two parallel jaw faces thereon and is adapted to be rotated.

3. An improved vise comprising:

a body having a top surface and a bottom surface and a central slot formed therethrough, and a fixed jaw formed thereon said top surface;

a moveable jaw with an axial orifice formed therethrough; and a ratchet drawbar having a proximate end and a distal end;

a base clamp plate attached to said bottom surface of said body so as to form a peripheral edge extending from said body;

a roll hinge affixed adjacent a distal end of said bottom surface of said body;

a gauge roll affixed adjacent a proximate end of said bottom surface of said body; and at least one mechanical fastener;

wherein said proximate end engages said moveable jaw, said ratchet drawbar passes through both said axial orifice and said central slot, and said distal end engages said bottom surface of said body so as to slidingly connect said moveable jaw to said body; and wherein said body is attached to said base by at least one said mechanical fastener, and wherein said body is pivotally attached to said base by said roll hinge, and wherein said movable jaw has at least two of said jaw faces that reside parallel to each other thereon and is adapted to be rotated.

4. An improved vise comprising:

a body having a top surface and a bottom surface and a central slot formed therethrough, and a fixed jaw formed thereon said top surface;

a moveable jaw with an axial orifice formed therethrough; and a ratchet drawbar having a proximate end and a distal end;

a base clamp plate attached to said bottom surface of said body so as to form a peripheral edge extending from said body; and at least one mechanical fastener;

wherein said proximate end engages said moveable jaw, said ratchet drawbar passes through both said axial orifice and said central slot, and said distal end engages said bottom surface of said body so as to slidingly connect said moveable jaw to said body; and wherein said body is attached to said base by at least one said mechanical fastener, and wherein said body has at least one cylindrical sawtooth rack matingly conformed to said distal end of said ratchet drawbar formed on said bottom surface thereof said body, adjacent to said central slot, and wherein said moveable jaw has a first jaw lip and a parallel second jaw lip formed on a upper surface thereof and wherein said fixed jaw has a third jaw lip formed on an upper surface thereof.

5. The improved vise of claim 4 wherein said roll hinge comprises a right cylinder having a central section with a first central diameter and two end sections with a second lesser diameter, and two cylindrical end caps matingly conformed to accept said end sections, and wherein said central section has at least one first axial recess therethrough adapted to accept a mechanical fastener and wherein said end caps have at least one second axial recess therethrough adapted to accept a mechanical fastener.

6. The improved vise of claim 5 wherein said end sections are connected to said body and said right cylinder is connected to said base.

7. The improved vise of claim 5 wherein said end sections are connected to said base and said right cylinder is connected to said body.

8. The improved vise of claim 7 wherein said gauge roll is a precision ground cylindrical bar with at least one shaft therethrough adapted to receive a mechanical fastener for attachment to said body.

9. The improved vise of claim 8 wherein the number of cylindrical sawtooth racks are two.

10. The improved vise of claim 9 wherein said mechanical fasteners are cap head screws.

* * * * *